US007558602B2

(12) United States Patent
Kogiantis et al.

(10) Patent No.: US 7,558,602 B2
(45) Date of Patent: Jul. 7, 2009

(54) METHOD FOR MULTI-ANTENNA SCHEDULING OF HDR WIRELESS COMMUNICATION SYSTEMS

(75) Inventors: Achilles George Kogiantis, Madison, NJ (US); Lawrence Howard Ozarow, Morris Township, Morris County, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 673 days.

(21) Appl. No.: 09/950,913

(22) Filed: Sep. 12, 2001

(65) Prior Publication Data

US 2003/0073444 A1    Apr. 17, 2003

(51) Int. Cl.
*H04B 1/38* (2006.01)
(52) U.S. Cl. ............... 455/561; 455/452.1; 455/452.2; 455/509
(58) Field of Classification Search ............... 455/403, 455/422.1, 423–425, 436, 440–444, 450–454, 455/500–502, 506, 509–513, 515, 524, 525, 455/526, 63.1, 63.2, 63.4, 103, 114.2, 67.11, 455/67.13, 67.14, 226.1–226.3, 343.3, 562.1, 455/405
See application file for complete search history.

(56) References Cited

U.S. PATENT DOCUMENTS

| | | | |
|---|---|---|---|
| 5,923,650 A * | 7/1999 | Chen et al. | 370/331 |
| 6,229,795 B1 * | 5/2001 | Pankaj et al. | 370/329 |
| 6,285,312 B1 * | 9/2001 | Thomassen | 342/157 |
| 6,317,435 B1 * | 11/2001 | Tiedemann et al. | 370/441 |
| 6,377,809 B1 * | 4/2002 | Rezaiifar et al. | 455/455 |
| 6,400,699 B1 * | 6/2002 | Airy et al. | 370/329 |
| 6,434,367 B1 * | 8/2002 | Kumar et al. | 455/70 |
| 6,694,147 B1 * | 2/2004 | Viswanath et al. | 455/517 |
| 6,741,862 B2 * | 5/2004 | Chung et al. | 455/452.1 |
| 6,778,507 B1 * | 8/2004 | Jalali | 370/317 |
| 6,836,666 B2 * | 12/2004 | Gopalakrishnan et al. | 455/452.2 |
| 2002/0027889 A1 * | 3/2002 | Yun et al. | 370/331 |
| 2002/0123365 A1 * | 9/2002 | Thorson et al. | 455/524 |
| 2002/0151310 A1 * | 10/2002 | Chung et al. | 455/452 |
| 2002/0183064 A1 * | 12/2002 | Gopalakrishnan et al. | 455/452 |
| 2002/0183066 A1 * | 12/2002 | Pankaj | 455/453 |
| 2003/0002461 A1 * | 1/2003 | Chaponniere et al. | 370/335 |
| 2003/0002464 A1 * | 1/2003 | Rezaiifar et al. | 370/336 |
| 2003/0003921 A1 * | 1/2003 | Laakso | 455/453 |
| 2003/0013451 A1 * | 1/2003 | Walton | 455/447 |
| 2003/0050084 A1 * | 3/2003 | Damnjanovic et al. | 455/522 |
| 2003/0053435 A1 * | 3/2003 | Sindhushayana et al. | 370/342 |

(Continued)

FOREIGN PATENT DOCUMENTS

WO    WO 00/14900    3/2000

OTHER PUBLICATIONS

Ramin Rezaiifar, et al, "Proof of Convergence for the Distributed Optimal Rate Assignment Algorithm", *Vehicular Technology Conference*, (May 16-20, 1999), pp. 1841-1845.

(Continued)

*Primary Examiner*—Alexander Eisen
*Assistant Examiner*—Dai A Phuong

(57) ABSTRACT

A method of providing a plurality of schedulers for independently scheduling multiple subscribers to increase the capacity and/or throughput of an HDR wireless communication system. Each scheduler is associated with base station equipment and an antenna that receive channel conditions on which the scheduling of subscribers are based.

3 Claims, 2 Drawing Sheets

U.S. PATENT DOCUMENTS

2004/0142714 A1* 7/2004 Viswanath et al. .......... 455/517
2004/0233867 A1* 11/2004 Wheatley et al. ............ 370/328

OTHER PUBLICATIONS

A. Jalali, et al, "Data Throughput of CDMA-HDR a High Efficiency-High Data Rate Personal Communication Wireless System", *Vehicular Technology Conference Proceedings*, Tokyo, (May 15-18, 2000) pp. 1854-1858.

Paul Bender, et al, "CDMA/HDR: A Bandwidth-Efficient High-Speed Wireless Data Service for Nomadic Users", *IEEE Communications Magazine*, vol. 38, No. 7, (Jul. 2000), pp. 70-77.

European Search Report.

* cited by examiner

METHOD FOR MULTI-ANTENNA SCHEDULING OF HDR WIRELESS COMMUNICATION SYSTEMS

RELATED APPLICATIONS

Related subject matter is disclosed in the following applications concurrently filed herewith: U.S. patent applications entitled "Method For The Simultaneous Uplink and Downlink Conveyance Of Information Between Multiple Mobiles And a Base Station Equipped With Multiple Antennas", Ser. No. 09/950,912 and "Method Of Allocating Power For The Simultaneous Downlink Conveyance Of Information Between Multiple Antennas and Multiple Destinations", Ser. No. 09/950,741.

BACKGROUND OF THE INVENTION

1. Field of the Invention

The present invention relates to wireless communication systems.

2. Description of the Related Art

Communication systems and in particular, wireless communication system are designed to meet the varying demands of their subscribers. Service providers, which are entities that own, operate and properly maintain communication systems, are constantly seeking ways to improve the overall performance of a communication system without incurring substantial cost increases in the operation of such communication systems. In particular, as wireless communication systems become more and more popular, service providers have to provide communication systems that allow subscribers to convey (i.e., transmit and/or receive) relatively larger amounts of information per unit time. The amount of information conveyed per unit time is the information rate. The total amount of information that can be conveyed over a system is usually referred to as a system's capacity. The amount of information that is successfully conveyed (i.e., information transmitted and received without errors) over a communication system is usually referred to as system throughput. Subscribers of a communication system with a certain system capacity are limited in the amount of information they can convey at any instant of time. Depending on the conditions of the communication channels through which the subscribers convey information, the subscriber throughput and/or capacity will not remain fixed. Therefore, there may be times when a subscriber desires to convey information at a certain information rate with a certain throughput, but will not be able to do so because of adverse channel conditions. In particular, the communication system may not be able to accommodate a subscriber desiring relatively higher information rates.

To address the problem of a subscriber's inability to convey information at a desired information rate, subscribers use equipment (e.g., cell phones or mobiles) that have multiple antennas instead of only one antenna. The use of additional antennas in a subscriber's equipment gives the subscriber the ability to convey information at relatively higher rates. However, the increased capacity of the subscriber's equipment through the use of additional antennas will still be limited by the system's capacity at any instant of time. For example, a subscriber equipment having multiple antennas may have the capability and desire to convey information at a certain rate, but will be limited to a lesser rate by the system at a particular instant of time. In sum, it is the system's capacity—not the capacity of a subscriber's equipment—which ultimately governs the rate at which a subscriber conveys information.

High Data Rate (HDR) communication systems are Code Division Multiple Access (CDMA) wireless communication systems over which subscribers convey mostly data information. Data information are typically non-voice information (e.g., text or graphics information) represented in digital format. As with other wireless communication systems service providers of HDR systems want to increase system capacity and throughput of such systems without incurring significant increases in the cost of equipment.

What is therefore needed is a method of increasing capacity and throughput of an HDR communication system without a service provider of such a system having to incur significant increase in cost of equipment.

SUMMARY OF THE INVENTION

The present invention provides a method that allows a service provider to increase the throughput and/or capacity of a wireless communication system such an HDR system. Multiple schedulers and associated antennas are provided to simultaneously transmit information over downlink communication channels. Each antenna is associated with a scheduler that schedules subscribers based on channel conditions from the subscribers received and processed by base station equipment associated with that antenna. In particular, channel conditions received by the multiple antennas from subscribers requesting access to the communication system or from subscribers being provided access to the communication system are transferred to the antennas' associated base station equipment and scheduler. The base station equipment then process the received channel conditions and apply the processed channel conditions to their respective schedulers.

Each of the schedulers then schedules or is capable of scheduling, independently of any other scheduler, one subscriber whose set of channel conditions satisfy a criterion or criteria set by the service provider. The scheduled subscribers are selected through the use of various algorithms implemented by the schedulers. The scheduled subscribers are given access to the entire group of downlink channels of the antenna for a particular period of time determined by the schedulers. In another embodiment, the scheduled subscribers are given access to a portion of the downlink channels. Therefore, the method of the present invention allows multiple schedulers to schedule multiple subscribers allowing these multiple subscribers to simultaneously receive information from multiple associated antennas over downlink communication channels thus increasing the capacity and/or throughput of the HDR system.

It should be noted that the multiple antennas need not be co-located at a particular base station and the schedulers of the present invention can be part of the base station equipment or part of other system equipment operated, maintained and owned by the service provider of the communication system.

DETAILED DESCRIPTION

The present invention provides a method that allows a service provider to increase the throughput and/or capacity of a wireless communication system such an HDR system. Multiple schedulers and associated antennas are provided to simultaneously transmit information over downlink communication channels. Each antenna is associated with a scheduler that schedules subscribers based on channel conditions from the subscribers received and processed by base station equipment associated with that antenna. In particular, channel conditions received by the multiple antennas from subscribers requesting access to the communication system or from subscribers being provided access to the communication system are transferred to the antennas' associated base station equipment and scheduler. The base station equipment then process the received channel conditions and apply the processed channel conditions to their respective schedulers.

Each of the schedulers then schedules or is capable of scheduling, independently of any other scheduler, one subscriber whose set of channel conditions satisfy a criterion or criteria set by the service provider. The scheduled subscribers are selected through the use of various algorithms implemented by the schedulers. The scheduled subscribers are given access to the entire group of downlink channels of the antenna for a particular period of time determined by the schedulers. In another embodiment, the scheduled subscribers are given access to a portion of the downlink channels. Therefore, the method of the present invention allows multiple schedulers to schedule multiple subscribers allowing these multiple subscribers to simultaneously receive information from multiple associated antennas over downlink communication channels thus increasing the capacity and/or throughput of the HDR system.

It should be noted that the multiple antennas need not be co-located at a particular base station and the scheduler of the present invention can be part of the base station equipment or part of other system equipment operated, maintained and owned by the service provider of the communication system. The terms 'subscriber' and 'subscriber equipment' will hereinafter be used interchangeably to denote a subscriber of the communication system using typical subscriber equipment to convey information over the system.

Figure 1:
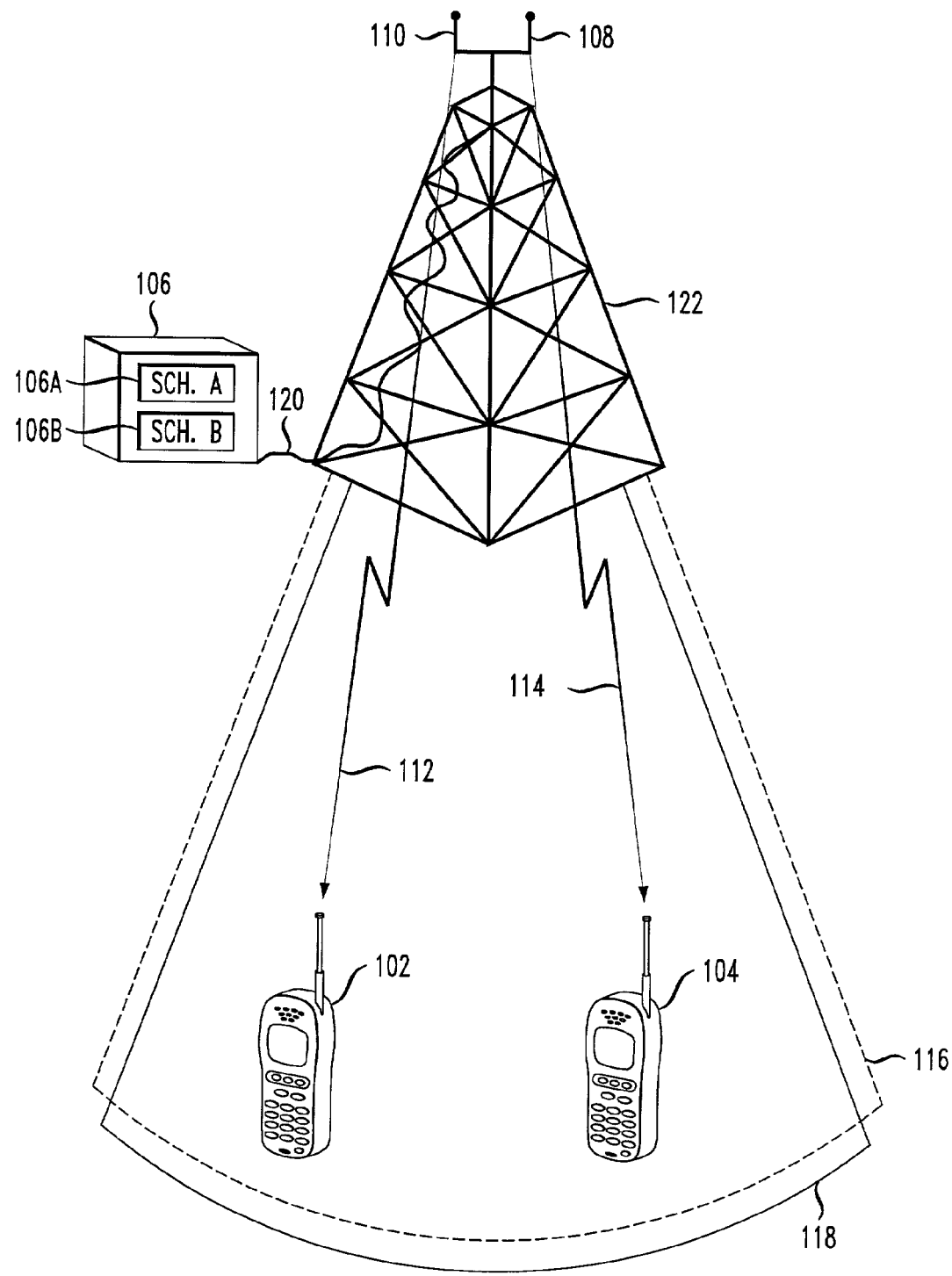
FIG. 1 shows a portion of an HDR wireless communication configured to practice the method of the present invention.

Referring now to FIG. 1, there is shown a portion of an HDR wireless communication system in compliance with the 1xEV-DO and/or the IS-856/C.S0024 standard and comprising a base station and two subscriber equipment (102, 104) shown as cellular phones. It should be noted that the subscriber equipment is not limited to cellular phones but can be any type of communication equipment (e.g., laptop personal computer, Personal Digital Assistant (PDA)) typically used by subscribers of communication systems. Also, the method of the present invention is not limited to 1xEV-DO HDR communication systems.

The base station has base station equipment comprising tower 122 with two antennas 108 and 110 connected to electrical and electronic equipment 106 via cable 120. Cable 120 can be a coaxial cable, an electrical wire cable, an optical fiber cable or any combination thereof. The method of the present invention is applicable to system equipment having N antennas where N is an integer equal to 2 or greater. When one of the N antennas receives information, the information is transferred to at least one of J schedulers where J is an integer equal to 2 or greater and is not necessarily equal to N. Also, the number of subscribers in simultaneous communication with the base station is not limited to two; the method of the present invention is applicable to a plurality of subscribers being scheduled to communicate with a plurality of antennas associated with base station equipment or other system equipment having a plurality of schedulers. However, for ease of explanation, the base station depicted in FIG. 1 and the description which follows refer to two antennas and associated base station equipment having two schedulers in communication with two subscribers.

Still referring to FIG. 1, electrical and electronic equipment 106 comprise typical radio equipment and signal processing equipment used to generate and process communication signals. Scheduler 106A forms part of or is associated with equipment 106 and can be implemented as software, firmware, hardware or any combination thereof. Scheduler 106B also forms part of or is associated with equipment 106 and also can be implemented as software, hardware, firmware or any combination thereof. The schedulers schedule one of the subscribers whose channel conditions are transferred to or applied to the schedulers. Scheduling is the selection of a subscriber based on that subscriber's channel conditions to provide that subscriber access to at least one channel of the downlink or all of the channels of the downlink. Schedulers 106A and 106B operate independently of each other but may use common radio and signal processing equipment as described above. However, equipment 106 can also be compartmentalized so that each scheduler is part of or is associated with separate radio and signal processing equipment that operate independently of other radio and signal processing equipment.

Antennas 108 and 110 are coupled to base station equipment associated with all of the schedulers so that any information received by any antenna is transferred to the proper base station equipment and scheduler. The information received by the antennas contain identification information that indicate which scheduler and associated radio and processing equipment such information is to be applied. The transferring of received information to a scheduler refers to inputting the information to the scheduler to allow the scheduler to schedule the information using one or more scheduling algorithms.

Subscribers 102 and 104 communicate with the base station over an air interface. The air interface comprises communication channels through which traffic signals and signaling information are conveyed. The traffic signals are the signals being conveyed between different subscribers or between subscribers and base station equipment or other system equipment. System equipment are any equipment that are part of the communication system which are owned, operated and maintained by the service provider. The signaling information are information being conveyed between subscriber equipment and base station equipment. The signaling information is used to operate the communication system in accordance with a particular protocol from the standard (i.e., 1xEV-DO) being followed by the communication system.

The communication channels constituting the air interface are uplink channels and downlink channels. The uplink channels (not shown) are channels through which subscriber equipment transmit information to a base station or other system equipment. There are also uplink signaling channels (not shown) used by the subscriber equipment to transmit signaling information to the base station or other system equipment. The downlink traffic channels shown in FIG. 1 as channels 112 and 114 are communication channels through which the base station (or other system equipment) transmit information to the subscriber equipment. There are also downlink signaling channels (not shown) which are used by the base station or other system equipment to transmit signaling information to the subscriber equipment. FIG. 1 shows antenna 108 transmitting traffic information to subscribers 104 via downlink channel 114 while antenna 110 is transmitting traffic information to subscriber 102 via downlink channel 112.

For transmission purposes, antennas 108 and 110 are associated with certain base station equipment and scheduler. The base station equipment and scheduler that are transmitting to a subscriber are further associated with one of J overlaid cell sectors. It should be noted that the number of overlaid sectors or cells is equal to the number of schedulers. In FIG. 1, the sectors of a cell which are being served by the base station equipment 106 and schedulers 106A and 106B are cell sectors 116 and 118 respectively. Cell sectors 116 and 118 are part of cells typically divided into three sectors. Cell sectors 116 and 118 cover generally the same physical area; however, the sectors are associated with different schedulers so that subscribers may be physically located in the same area but are being served by different sectors.

In HDR communication systems such as the one partially depicted in FIG. 1, all of the channels of a downlink communication channels are used to transmit information to a subscriber. In other words, in sector 116, scheduler 106A and associated base station equipment along with antenna 110 generate and transmit traffic information (and signaling information) to subscriber 102 over all channels of downlink communication channel 112. In a similar manner, in sector 118, scheduler 106B and associated base station equipment along with antenna 108 generate and transmit traffic information (and signaling information) to subscriber 104 over all channels of communication channel 114.

Thus, scheduler 106A and associated base station equipment along with antenna 110 form part of a communication sub-system that serves its designated cell and sectors such as sector 116. Scheduler 106B and associated base station equipment along with antenna 108 form part of another communication sub-system that serves its designated cells and sectors such as sector 118. The number of communication sub-systems is equal to the number of schedulers. The communication system thus comprises a plurality (i.e., J) of communication sub-systems. Thus multiple subscribers can gain access to (or be provided access to) multiple communication sub-systems each of which is associated with a scheduler that schedules the subscribers allowing them to simultaneously convey information over the communication system thus increasing the capacity and/or throughput of the communication system.

Figure 2:
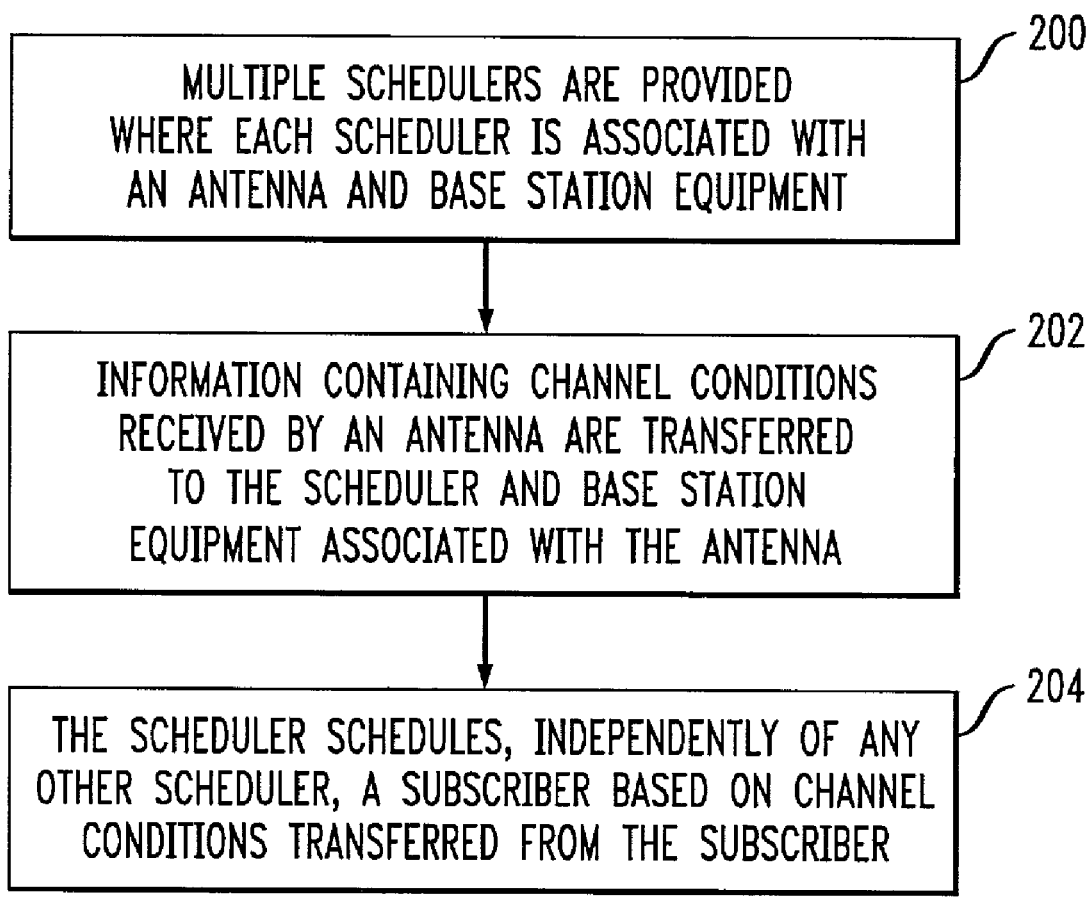
FIG. 2 shows a flowchart depicting the method of the present invention.

Referring now to FIG. 2, there is shown a flowchart of the steps of method of the present invention. In step 200, multiple antennas are provided where each such antenna is associated with a scheduler that is part of a particular base station equipment. An antenna is associated with a particular base station equipment when information to be transmitted by the base station equipment is transmitted with said antenna. The base station equipment can be configured in various ways to satisfy its association with a particular antenna. For example, a separate set of base station equipment can be built so that such equipment is exclusively coupled to its associated antenna. Thus, in such a case, for a cell divided into three sectors, there are three separate base station equipment each exclusively coupled to its associated antenna. Therefore a multiple of antennas would illuminate the same sector or symbolically illuminate a multiple of overlaid sectors. Another example is when more than one antenna is coupled to a particular base station equipment allowing antennas to share the same equipment. Thus in such a case, the shared base station equipment is designed to be virtually separated so that information is transmitted simultaneously by the coupled antennas. Therefore, a multiple of antennas would illuminate the same cell or symbolically illuminate a multiple of overlaid cells.

The scheduling and transmission of the information is done independently of the scheduling and transmission of any other coupled antenna. Even though one base station equipment is being shared by a multiple of antennas, the operation of such base station equipment make it appear as if there are a multiple of base station equipment (i.e., separate virtual base station equipment) each coupled to its associated antenna. The particular configuration of the base station equipment and antennas depends on the service provider's preference.

In step 202, information received by the antennas are transferred to the proper base station equipment and associated scheduler. Subscribers include identification information within their transmitted information to indicate or identify which base station equipment they want to process their information. Subscribers typically initiate communication with a base station by transmitting a request to gain access to the communication system. Also, sometimes the base station initiates communication with a subscriber equipment to provide access to the subscriber equipment. For example, an incoming call to a subscriber equipment from a calling party allows the base station to provide access to the subscriber equipment. As in most wireless communication systems, the base station equipment are assigned particular identification codes. Referring back to FIG. 1, each communication sub-system has its own identification code. A subscriber requesting access to a particular communication sub-system would include the identification code of that particular sub-system in its request. The subscriber decides which communication sub-system and thus which scheduler it wants to process its information by analyzing downlink signals from the various base station equipment.

Each base station equipment associated with an antenna periodically broadcasts pilot signals to be received by subscriber equipment located in the cell being serviced by the base station equipment. The pilot signals are distinguished from each other with the use of different techniques. In CDMA systems for example, the pilot signals are given different Pseudo Noise (PN) codes making them pseudo orthogonal to each other. Various well known characteristics (e.g., amplitude, power level, channel gain, phase, frequency translation) of the pilot signals are measured by the receiving subscriber equipment. A set of measured characteristics are known as channel conditions. In particular, measured characteristics for signals (e.g., pilot signals) transmitted over downlink channels are known as downlink channel conditions. A subscriber can include a pilot's identification code in the set of downlink conditions it transmits to the base station.

In HDR systems and other wireless CDMA communication systems, each subscriber equipment generates a Data Rate Control (DRC) value that is related to the channel gain measured by the subscriber equipment for a particular pilot. The DRC, which is calculated from the measured channel gain, is the rate at which the particular subscriber equipment desires to transmit information to a base station and/or receive information from the base station. Each subscriber equipment includes the DRC as part of the set of downlink channel conditions transmitted to the base station. In a cell or a sector where a multiple of pilot signals are being broadcast simultaneously, a subscriber equipment measures the characteristic of a particular pilot signal while the other pilot signals are also being broadcast. The other pilot signals are interpreted as noise by the measuring subscriber equipment. Thus, a subscriber equipment measures characteristics of the broadcast pilot signals as described above and selects one of the pilot signals and therefore the antenna and associated base station equipment from which the selected pilot signal originates.

Typically, the subscriber equipment selects the pilot signal yielding the highest DRC of any of the pilot signals being broadcast. As previously stated, the DRC associated with a pilot signal is related to the channel gain of that pilot signal. The channel gain is the ratio of measured received power of a signal (e.g., pilot signal) to the power level at which the signal is transmitted. The base station equipment broadcasting the pilot signals have a particular amount of power available to them. One way of allocating the available power is to evenly distribute it amongst the various base station equipment and antenna of each communication sub-system. For example, referring back to FIG. 1, when a total power of P watts is available to the base station shown, the amount of $$\frac{P}{2}$$

watts is allocated to each antenna and associated base station equipment (i.e., each communication sub-system). Therefore, in general, for even distribution when there are N antennas and P watts available, each antenna and associated base station equipment is allocated $$\frac{P}{N}$$

watts. N is an integer equal to 2 or greater. The amount of power allocated to a base station equipment directly affects the channel gain and thus the DRC capability of the base station equipment. It should be noted that the method of the present invention is not limited to the even distribution of available amongst the multiple of antennas. Different proportions of the available power can be allocated to the antennas so that some antennas are given more (or less) power than others.

In step 204 the received information is applied to the scheduler associated with the base equipment to which the information was transferred. The scheduler schedules the received information appropriately. The scheduler uses some type of scheduling algorithm to schedule one of a multiple of information received from a multiple of subscribers. The scheduling of received information from a subscriber is selecting that received information and process said received information in accordance with a scheduling algorithm such that the subscriber from which the information originate is given access to the downlink channels of the base station for a defined period of time. Each scheduler operates similarly, but independently of each other. Therefore, multiple schedulers are scheduling multiple subscribers such that each scheduler gives a scheduled subscriber access to the downlink channels of the base station equipment associated with the scheduler.

One particular algorithm that can be used by the scheduler is to give access (of the downlink channels) to the subscriber that has the highest DRC of all the subscribers being applied to the scheduler. Another algorithm called the Proportional Fail Algorithm is where the scheduler gives access to the subscriber having the highest DRC/Average rate ratio of all of the subscribers being applied to the scheduler. The average rate is an algebraic average or other average (e.g., average of set of most recent DRC values) of the delivered information rate of a subscriber for a defined period of time. The scheduler keeps a record of delivered DRC values for a subscribers. A subscriber requests an information rate by transmitting a particular DRC value to the scheduler. If the subscriber is allowed to convey information at that rate, then the rate is said to have been delivered. If the requested rate is not allowed then the DRC value is set to zero. An average of the delivered DRC values is calculated over a defined period of time to obtain the average rate. At any particular instant of time, a subscriber equipment has a DRC and the ratio of this DRC to the average rate is used by the scheduler to select one of a multiple of subscribers to be given access to the downlink of the base station equipment associated with the scheduler.

It should be noted that the multiple schedulers operating independently of each other need not all use the same algorithm to schedule the subscribers being applied to them. Certain subscribers may schedule subscribers with the highest DRC while others schedule subscribers based on the DRC/Average rate ratio. It should also be noted that the method of the present invention can be implemented with schedulers that use scheduling algorithm other than the two algorithms discussed above. Other well known or service provider designed algorithms can be used to provide the proper scheduling. Therefore, because multiple subscribers can obtain access to the downlink channels of base station equipment and associated antennas for a defined period of time through simultaneous scheduling by multiple schedulers, the capacity and throughput of an HDR communication system can be increased significantly.

We claim:

1. A method of wireless communication between a plurality of subscribers and base station equipment having a plurality of antennas of a wireless communication system, the method comprising:

providing a plurality of schedulers at said base station equipment for independently scheduling said plurality of subscribers;

associating each scheduler of said plurality of schedulers with said base station equipment and an antenna of said plurality of antennas to receive channel conditions from said plurality of subscribers;

enabling said plurality of schedulers to schedule said plurality of subscribers based on said channel conditions, wherein scheduling being to said plurality of subscribers during at least partially overlapping time periods over downlink communication channels;

using said plurality of antennas associated with said base station equipment for scheduling said plurality of subscribers in the wireless communication system;

enabling a service provider to increase at least one of capacity and throughput of the wireless communication system in response to using said plurality of antennas associated with said base station equipment for scheduling, wherein the wireless communication system is a high data rate system;

using said plurality of schedulers and said plurality of antennas associated with said base station equipment to transmit information over said downlink communication channels during at least partially overlapping time periods; and identifying one or more subscribers of said plurality of subscribers with a set of channel conditions that satisfy a criterion set by said service provider for said plurality of schedulers.

2. The method of claim 1, further comprising:

causing said plurality of schedulers to select a set of subscribers to schedule.

3. The method of claim 1, further comprising:

providing the set of scheduled subscribers access to the entire group of downlink communication channels of said antenna of said plurality of antennas for a particular period of time determined by said scheduler.

* * * * *